United States Patent [19]
Gold

[11] Patent Number: 4,949,509
[45] Date of Patent: * Aug. 21, 1990

[54] AUTOMOTIVE WINDOW MOUNTING ASSEMBLY

[76] Inventor: Peter N. Gold, 465 N. Wood Ave., Rockville Centre, N.Y. 11570

[ * ] Notice: The portion of the term of this patent subsequent to Mar. 14, 2006 has been disclaimed.

[21] Appl. No.: 365,251

[22] Filed: Jun. 12, 1989

[51] Int. Cl.$^5$ .............................................. B60J 5/04
[52] U.S. Cl. ........................................ 49/502; 49/375
[58] Field of Search ................ 49/348, 352, 374, 375, 49/376, 377, 502

[56] References Cited

U.S. PATENT DOCUMENTS

| | | | |
|---|---|---|---|
| 1,641,157 | 9/1927 | Cook | 49/377 |
| 3,252,256 | 5/1966 | Sprecher | 49/374 |
| 3,584,415 | 6/1971 | Keefe | 49/374 X |
| 3,808,743 | 5/1974 | Renner et al. | 49/502 |
| 4,321,771 | 3/1982 | Koike | 49/348 X |
| 4,449,326 | 5/1984 | Hori et al. | 49/375 |
| 4,502,248 | 3/1985 | Thomas, Jr. et al. | 49/374 |
| 4,762,904 | 8/1988 | Nakama | 49/348 X |
| 4,771,575 | 9/1988 | Tiesler | 49/375 X |
| 4,783,930 | 11/1988 | Tiesler | 49/374 |
| 4,811,519 | 3/1989 | Gold | 49/502 X |

FOREIGN PATENT DOCUMENTS 2409619 2/1974 Fed. Rep. of Germany ........ 49/351

Primary Examiner—Gary L. Smith
Assistant Examiner—Michael J. Milano
Attorney, Agent, or Firm—Collard, Roe & Galgano

[57] ABSTRACT

An assembly for mounting a window panel adapted to be raised and lowered by a mechanism is mounted within an automobile door. The automobile door is of the type having a peripheral frame extending upwardly and toward the interior of the vehicle from the window line of the door. The peripheral frame is adapted for supporting the outer periphery of the window panel when the window is in a fully raised position. The apparatus includes a window panel receiving element which is placed along the bottom of the window and has a pair of opposed sides having a first end thereof adapted to be fixedly attached to the inside and outside surface of the window panel. The receiving element has a second end, connected to the first end by a flexible connecting portion. The second end has a pair of downwardly extending leg portions adapted to resiliently engage a window engagement element on the mechanism for raising and lowering the window panel, thereby coupling the window to the mechanism. The length of the flexible connecting portion of the window panel receiving element is predetermined such that the window bottom is spaced above the window line on the door frame when the window panel is in its raised position.

7 Claims, 3 Drawing Sheets

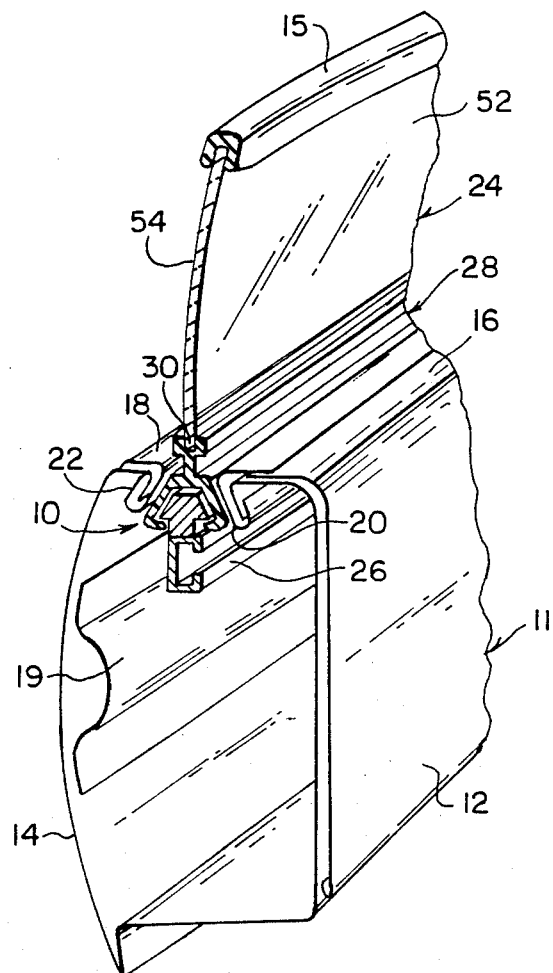
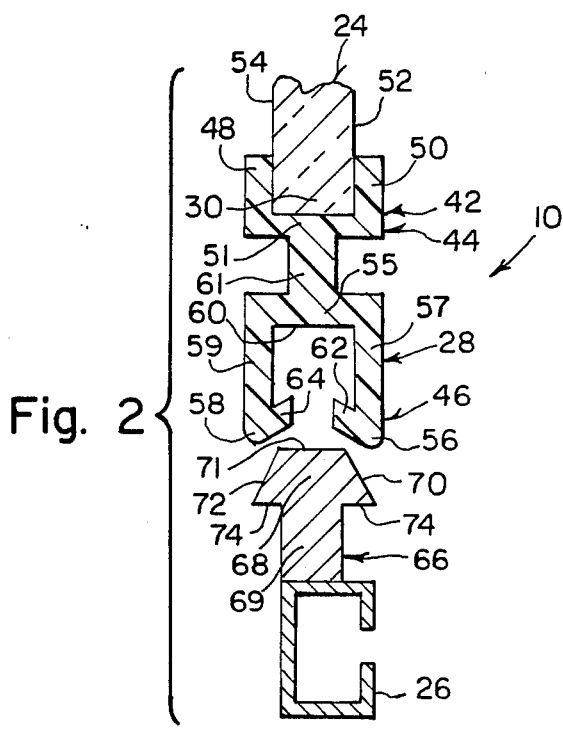
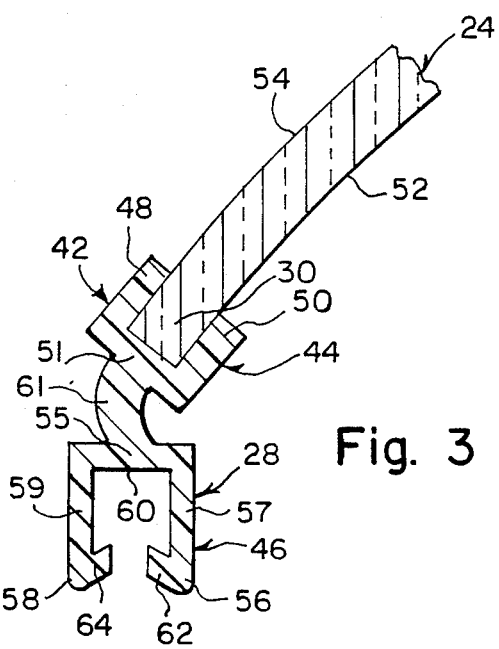

AUTOMOTIVE WINDOW MOUNTING ASSEMBLY

BACKGROUND OF THE INVENTION

1. The Field of the Invention

This invention relates to an assembly for mounting glass window panels in automobile doors of the type having a peripheral frame extending around the periphery of the door which frame extends upwardly and inwardly toward the interior of the vehicle at an angle to the vertical. Specifically, the invention relates to an assembly for mounting the window which allows for the quick assembly of the window panel into the mechanism housed within the door which raises and lowers the window in a generally vertical manner. This assembly places the bottom edge of the window glass above the sill of the window opening when the window is in the fully raised position and can accommodate the glass being at an angle when fully raised, with respect to the path of the mechanism within the door.

2. Description of the Prior Art

Many problems arise because of the way automobile manufacturers have mounted side door window panels. Particularly, the so-called chattering of the window mounting assembly is caused by movement of the vehicle door panel with respect to the mounting assembly. In addition, iceing of the mounting assembly and subsequent disengagement of the mounting assembly from the lower cam is not at all unusual because the side window panel freezes closed and the occupant of the vehicle damages the window operator by exerting excessive pressure thereon. Additionally, disengagement of the lower mounting channel from the glass can occur or very high loads on retaining devices applied through the glass cause the glass panel to fracture. It is also not unusual for a vehicle door window to make noise due to the rattling between the door panel and the door glass of a vehicle when the window is cracked to let some outside air into the vehicle.

In addition, many difficulties exist in installing and replacing the glass window panels in automobile doors, especially those doors having an inwardly angled peripheral metal frame around the window opening in the door. These problems are compounded by the fact that the regulator mechanism in the door for raising and lowering the window positions the bottom edge of the glass window panel within the door even when the window is in a fully raised position.

The prior art design requires that the glass panel be installed only after the inside panel of the door has been removed. This is because the bottom edge of the window panel glass is provided with a sash channel in which the roller arms of the window regulator are installed. Since the rollers on the window regulator arm must be within the door even when the window is raised, this design necessitates that the bottom edge of the window panel also be within the interior of the door. Consequently, the inner door panel must be removed before installing or replacing the window. These problems are further compounded when the peripheral metal frame is angled inwardly toward the center of the vehicle to give the vehicle a rounded aerodynamic appearance.

Not only is the replacement of the window made more labor intensive because of the required door disassembly, but an additional problem is caused which arises when the vehicle is involved in a collision from the side. Because the bottom edge of the window panel is housed within the door frame below the sill of the window opening, which sill defines what is known as the "belt line" of the door, a collision produces forces acting on the outer panel of the door and on the mechanism for raising and lowering the window. These forces tend to break at least the lower portion of the window glass panel in the sash area. The transmission of these forces to the lower portion of the window panel is made worse by the now almost universal practice of installing a metal beam across the interior of the door from the side thereof adjacent the front of the vehicle to the side thereof towards the rear of the vehicle. While this beam provides protection to the vehicle occupant from side collisions, it results in higher forces being imparted to the bottom portion of the window panel via the door frame and window regulator even when the window is in its raised position.

In my prior U.S. Pat. No. 4,811,519, an assembly for mounting a window panel is disclosed which solves most of the aforementioned problems. The improved assembly of the present invention not only solves the aforementioned problems but allows the window to be raised in a channel in the frame which is not in line with the path of the window panel inside the door. This is accomplished by having a flexible window panel receiving element fixed to the window panel adapted to resiliently engage an extension on the sash element associated with a window regulator channel mounted within the interior of the door. In one embodiment of the invention, the connecting portion also has bulbous side portions which enhance the seal between the window and the door. The assembly includes a window panel receiving element adapted to be fixedly attached to the window panel. The window panel receiving portion of the receiving element is spaced a sufficient distance from a lower portion thereof adapted to resiliently engage the sash and thereby the window regulator by a flexible connecting element. The length of the flexible connecting element spaces the bottom edge of the window panel above the belt line or sill of the door when the window is in the fully raised position. Thus, should a collision from the side occur, the inward force produced by the movement of the outer door panel is not applied directly against the glass, thereby greatly reducing the forces thereon.

The flexible connecting element extends a predetermined distance between the glass receiving portion and the lower resilient portion of the window panel receiving element adapted to engage the sash of the window regulator mechanism. This distance is such that when the beam on the interior of the door contacts the window regulator mechanism, such as when the door is hit from the side, it causes bending forces to be developed within the window panel receiving element, causing it to deform. If the glass were within the door, forces would be applied in shear against the bottom edge of the glass. Since, when the window is in the raised position, the top and side peripheral edges thereof are fully contained within the full peripheral frame of the door, there is no possibility that the bottom edge of the glass can be forced into the interior of the vehicle when side forces are applied.

In addition, it can be seen that forming the lower resilient portion of the window panel receiving element as a female receiving portion, in combination with a mating male window engagement element on the sash of the window regulating mechanism, facilitates replacement of the window panel. These two elements in combination with the flexible connecting element allow for the replacement of a window panel by removing the damaged window, normally by rotating the window panel towards the front or rear of the vehicle, while the window regulator is in a partially lowered position. Similarly, a replacement window panel is installed with the female receiving portion of the window panel receiving element resiliently engaging the male window engagement element of the window regulator mechanism, thus obviating the need for removal of the interior panel of the door. Furthermore, the flexible connecting element allows the window panel to be tilted toward and away from the side of the vehicle.

SUMMARY OF THE INVENTION

It is an object of the invention to provide an assembly for mounting an automotive window panel within a vehicle door.

It is yet an additional object of the invention to provide an assembly for mounting a window panel in a vehicle door which permits the simple replacement of the window panel, places the bottom edge of the panel above the window sill or belt line when the window is in the raised position, and allows the window panel to tilt or pivot inwardly as it is being raised.

It is still an additional object of the invention to provide an assembly for mounting a window in an automobile door which is simple in design, easy to fabricate, easy to install, and which enhances the seal between the door and the window.

Accordingly, these objects are achieved by an assembly for mounting a window panel adapted to be raised and lowered by a mechanism mounted within an automobile door. The door is of the type having a peripheral frame extending upwardly from the sill of the window opening and completely around the periphery of the window opening, and extending inwardly from the sill towards the interior of the vehicle. The peripheral frame is slotted to form a channel supporting the periphery of the window panel in a well known manner when the window panel is in the fully raised position. The automobile door is of the type having an outer door panel and an inner door panel, the door panels forming an interior for housing and the window regulating mechanism used to raise and lower the window. Both the outer and inner door panels have complementary ends forming the sill of the window opening. These complementary ends extend inwardly towards the interior of the door at a predetermined vertical distance from the bottom of the door and are spaced a predetermined distance apart, thereby forming a gap through which the window panel may be raised and lowered.

The assembly includes a window panel receiving element in the form of two U-shaped resilient channel portions connected by a flexible connecting element. The upper U-shaped portion is adapted to receive the window panel and be fixed thereto. The generally U-shaped lower resilient female portion of the receiving element is adapted to resiliently capture a male portion fixed to the sash element of the window regulator mechanism which raises and lowers the window.

The sash element of the window regulator mechanism includes an upwardly extending male window panel engagement element having a pair of tapered surfaces and having a recess or shoulder thereon. The shoulder is adapted to capture cam-shaped surfaces fixed on the inside of the downwardly extending resilient legs of the generally U-shaped lower female portion of the window panel receiving element after these legs have been deflected outwardly by the tapered surface on the window panel engagement element. The cam-shaped surfaces thus spring inwardly and engage the shoulder and couple the window panel to the sash of the window regulating mechanism.

In order to seal around the window in the area of the gap formed between the ends of the inner and outer panels of the door, these ends include a generally downwardly extending flanged portion formed on each of the complementary ends of the inner and outer door panels. The flange portions extend generally downwardly and are inclined towards their respective inner and outer door panels at an angle matching the tapered surfaces of the male window panel engagement element on the sash associated with the window regulating mechanism. Thus, a seal is formed between the lower U-shaped female portion of the window panel receiving element and the complementary ends of the door panels when the window panel is in a raised position. The seal is enhanced by a pair of outwardly bulging side panels surrounding the flexible connecting element.

These and other objects and advantages of the present invention will become apparent from the following description of the accompanying drawings, which discloses two embodiments of the invention. It is to be understood that the drawings are to be used for purposes of illustration only, and not as a definition of the invention.

BRIEF DESCRIPTION OF THE DRAWINGS

Further advantages and details can be gleaned from the drawings wherein similar reference numerals denote similar elements throughout the several views:

FIG. 1 is a partial isometric view of the inside of an automobile door having the assembly for mounting a window panel of the present invention;

FIG. 2 is a partial cross sectional view of the connecting element shown in FIG. 1 prior to connection with the window regulator;

FIG. 3 is a partial side elevational view of the window panel assembly 2;

DETAILED DESCRIPTION OF THE PREFERRED EMBODIMENTS

Figure 4:
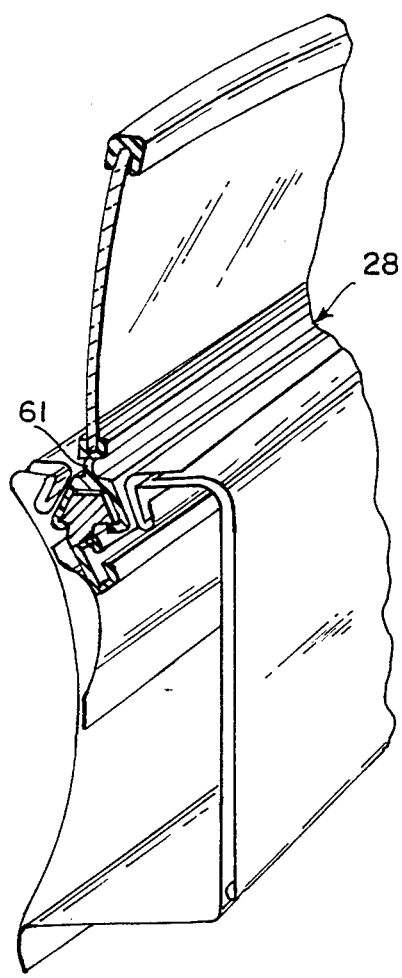
FIG. 4 is a partial isometric view of the inside of an automobile door having the assembly for mounting the window panel of the present invention after being impacted from the side, as during an accident.

Referring to FIG. 1, there is shown the window mounting apparatus of the present invention, generally denoted as 10, positioned within an automotive vehicle door 11, having an inner panel 12 and an outer panel 14 and a frame 15. Panels 12 and 14 include inwardly extending end portions 16 and 18, respectively, which form the sill of the window opening. The end portions include flanges 20 and 22, which are spaced a predetermined distance apart, thereby forming a gap through which a window panel 24 may extend. A conventional window panel 24 is raised and lowered via a window regulator (not shown), which is operatively connected to sash element 26. Sash element 26 is fixedly attached to window panel receiving element 28, which is bonded or otherwise fixedly attached to window panel 24. Thus, sash 26, window panel receiving element 28 and window panel 24 form an integral unit which may be raised and lowered by the window regulator mechanism. Since sash 26 must remain within the vehicle door even when window panel 24 is in its fully raised position, this results in the bottom 30 of window panel 24 being within the vehicle door at all times.

Typically, automotive vehicle door 11 is of the type having a peripheral frame 15 extending entirely around the window opening formed within door 11. Frame 15 is shaped so that it is tilted or curved inwardly toward the interior of the vehicle from the sill formed by end portion 16 and 18. A conventional window regulator mechanism (not shown) is mounted within door 11 and engages sash element 26 via rollers in a well-known manner. Door 11 includes inner panel 12 and outer panel 14, with outer panel 14 being stiffened by a beam member 19.

Referring to FIGS. 2 and 3, there is shown the window panel receiving element 28, the mounting apparatus 10 of the present invention having an upper U-shaped female portion 44. U-shaped upper portion 44 has ends 48 and 50 and a bottom 51 defining the U-shaped crossection. Ends 48, 50 extend parallel to and are attached to the inner and outer sides 52 and 54 of window panel 24. As in the prior art, this attachment may be made through any variety of well-known adhesives which serve to not only bond window panel receiving element 28 to the window panel 24, but also form a weather seal therebetween.

Window panel receiving element 28 includes a lower female U-shaped female portion 46 having legs 57 and 59, having second ends 56 and 58 and a cross member 55 which is spaced a predetermined distance from bottom 51. Flexible connecting portion 61 extends between opposed bottom side 51 and cross member 55 of the top and bottom U-shaped portion, respectively. Downwardly facing generally U-shaped female portion 46 of receiving element 28, defined by cross member 55 and the ends 56 and 58 of the lower legs 57 and 59, includes inwardly extending cam elements 62 and 64, respectively. Bottom U-shaped female portion 46 is manufactured in such a way and of such a flexible material that lower legs 57 and 59 thereof may be resiliently sprung outwardly.

It can be seen that, integrally formed with sash element 26, is a male window panel engagement element 66 extending along the entire length of sash element 26. Element 66 may be fixedly attached to sash 26, preferably by a mechanical attachment, such as by rivets or screws (not shown), or may be formed integrally therewith. Window panel engagement element 66 includes a generally trapezoidal tapered upper portion 68 having a base including a pair of recesses or shoulders 74 and a pair of inclined side surfaces 70 and 72 extending upwardly and inwardly from shoulders 74 at a predetermined angle and a top surface 71. Shoulders or recesses 74 extend along both sides of the window panel engagement element 66 along the entire length thereof. Preferably, window panel receiving element 28 runs almost the entire length of window panel 24 and the length of male window panel engagement element 66 is equal to the length of the sash element 26 which length is determined by the type of window regulating mechanism used.

Window panel engagement element 66 also includes a lower portion 69, narrower than and coupled to the base of trapezoidal upper portion 68, the bottom of which is attached to sash element 26 as described above. The height of lower portion 69 determines the distance from sash 26 to the bottom 60 of cross member 55 of lower portion 46 of window panel receiving element 28. When the window regulator raises window panel 24, element 66 first moves upwardly until surface 71 thereof contacts bottom surface 60 of cross member 55, and then the window panel 24 is raised. When the window regulator is lowered, shoulders or recesses 74 engage cam elements 62 and 64 and pull the window down.

To mount a window panel utilizing the assembly of the present invention, a window panel 24 having window panel receiving element 28 fixedly attached thereto is slid within the predetermined gap formed by flanges 20 and 22 of inner and outer door panels 12 and 14. The window regulator, and consequently sash element 26 and window panel engagement element 66, are placed in a partially raised position within the door. Window panel 24 is then inserted within the gap formed between flanges 20 and 22, normally at an angle with respect to the front or the rear of the door, in a manner wherein lower female U-shaped portion 46 of window panel receiving element 28 can receive male window panel engagement element 66.

Upon insertion, cam elements 62 and 64 engage tapered surfaces 70 and 72 of the outwardly tapered upper portion 68 of window panel engagement element 66. This engagement resiliently deflects legs 57 and 59 outwardly such that cam elements 62 and 64 are slid along tapered surfaces 70 and 72 until shoulders or recesses 74 are encountered. At this point, cam elements 62 and 64 and, consequently, ends 56 and 58, spring inwardly, thereby capturing window panel 24 onto the window panel engagement element 66. Normally, this assembly technique can be accomplished without having to remove the inner panel 12 of door 11, which would be the case in removing a window panel using the mounting apparatus of the prior art.

Should window panel 24 have to be replaced, the window is put in a partially lowered position and rotated with sufficient force in the front-to-rear direction of the door such that cam elements 62 and 64 downwardly deflect away from and disengage from shoulder 74 of element 66. Even should cam elements 62, 64 break upon removal, this is of no consequence since window panel receiving element 28 is designed to be discardable along with the broken window and a new element 28 is provided fixedly attached to the new window panel 24.

It can be seen that the window panel mounting apparatus of the present invention differs from the window panel mounting apparatus of the prior art in that instead of being integral, elements 28 and 66 are adapted to engage in a manner to facilitate initial assembly of window panel 24 into door 11 and also facilitate the replacement thereof.

An additional feature of the present invention is that flanges 20 and 22 of inner and outer door panel 12 and 14 may extend downardly and be outwardly inclined towards their respective panels at an angle generally complementary to the surfaces 70 and 72 of window panel engagement element 66. When window panel 24 is assembled to sash element 26 via elements 28 and 66, the resilient lower legs 57 and 59 of lower female U-shaped portion 46 take on a generally outwardly tapered shape corresponding to the taper of surfaces 70 and 72 after full engagement of cam surfaces 62 and 64 under shoulder 74. By making complementary end flanges 20 and 22 extend parallel to tapered surfaces 70 and 72 of window panel receiving element 28, it can be seen that when the window panel is in the raised position, the lower legs 57 and 59 of lower female U-shaped portion 46 cooperate with flanges 20 and 22 to form a seal, thereby preventing water from entering the interior of the door.

It is contemplated that the length of extension 69 on element 66 and the geometry of element 28 is such that when the window regulator raises the sash element 26 to its uppermost position as when the window panel 24 is in the fully closed position, the bottom edge 30 of the window panel is located above the sill or belt line defined by the upper surfaces of inwardly extending flanges 16 and 18 of inner and outer door panels 12 and 14. Thus, bottom side 51 of upper U-shaped female element 44 would be spaced upwardly from the sill or belt line of the door, with the height of lower portion 69 and the length of flexible connecting portion 61, determining the position of the sash element 26 within door 11. In the fully raised position, the top surface 71 of window panel engagement element 66 impinges on the bottom surface 63 of cross member 55, thus tightly holding the window in the closed position.

While flexible portion 61 of receiving element 28 allows the window panel to tilt from side to side with respect to door 11, it is made of a material sufficiently stiff so that pulling or pushing forces produced by the window regulator are transferred to window panel 24. Thus, flexible connecting portion 61 can flex from side to side, but does not compress or elongate when the window regulator is actuated. It has been found that a one-piece resilient material is suitable to form the entire window panel receiving element 42. The upper and lower U-shaped elements 44, 46 may be made of the same material or may be made from a different material than portion 61.

Referring to FIG. 4, there is shown the window panel mounting assembly of the present invention in its fully raised position after the vehicle has been impacted from the side. It can be seen that flexible connecting portion 61 of the window panel receiving element 28 allows for the lateral movement of the second end of the connecting element, with respect to the first end thereof, which is connected to the window panel. This not only prevents forces occurring during the side impact from being transferred from the window regulator mechanism to the window panel, but can allow for the repositioning of the window panel regulating mechanism when the door is being repaired.

Figure 5:
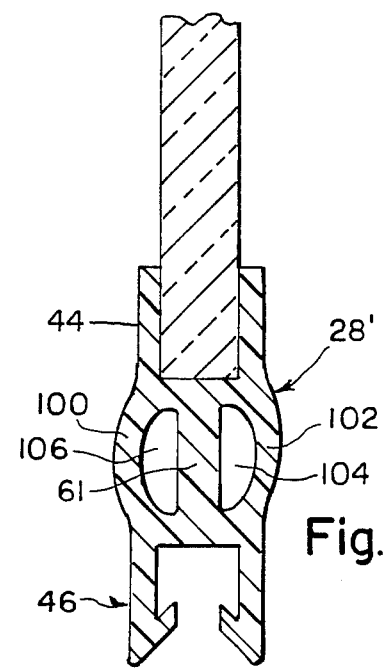
FIG. 5 is a partial cross-sectional view of a second embodiment of the connecting element shown prior to connection with the window regulator.
Figure 6:
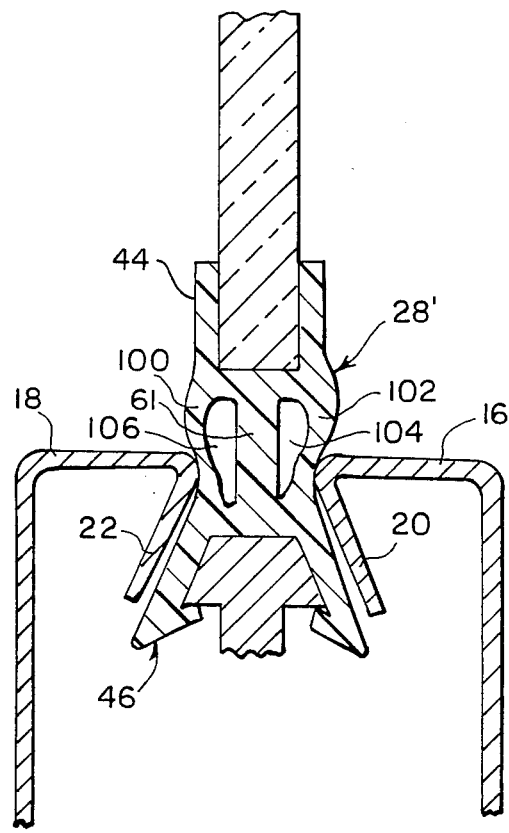
FIG. 6 is a partial side elevation view of the embodiment of the window panel mounting assembly shown in FIG. 5 in the closed position.

Referring to FIGS. 5 and 6, there is shown a second embodiment of the window panel receiving element 28' having upper and lower portions 44, 46 in which the central portion 61 is surrounded by a pair of outwardly bulging side walls 100, 102 defining openings 104, 106. These side walls still permit the required flexibility between the window panel and the second end of the window panel receiving element, but also produce a water-tight seal between the inwardly extending flange portions of the door. Side walls 100, 102 are positioned such that when the window is in its raised position, they contact with and are inwardly deformed by end portions 16, 18 and flanges 20 and 22. Sidewalls 100, 102 also serve to prevent and/or minimize dirt, sand and other debris from collecting in the window panel gap which often cause scratching of the window panel following repeated opening and closing thereof. The second embodiment again includes the same lower connecting element 44 as hereinabove described. Tubular bulbous channels 104, 106 can also be used as a path for a heating element wire, such as for heating the side windows of an automobile, or can be used for other purposes requiring directing a wire through the door.

Figure 7:
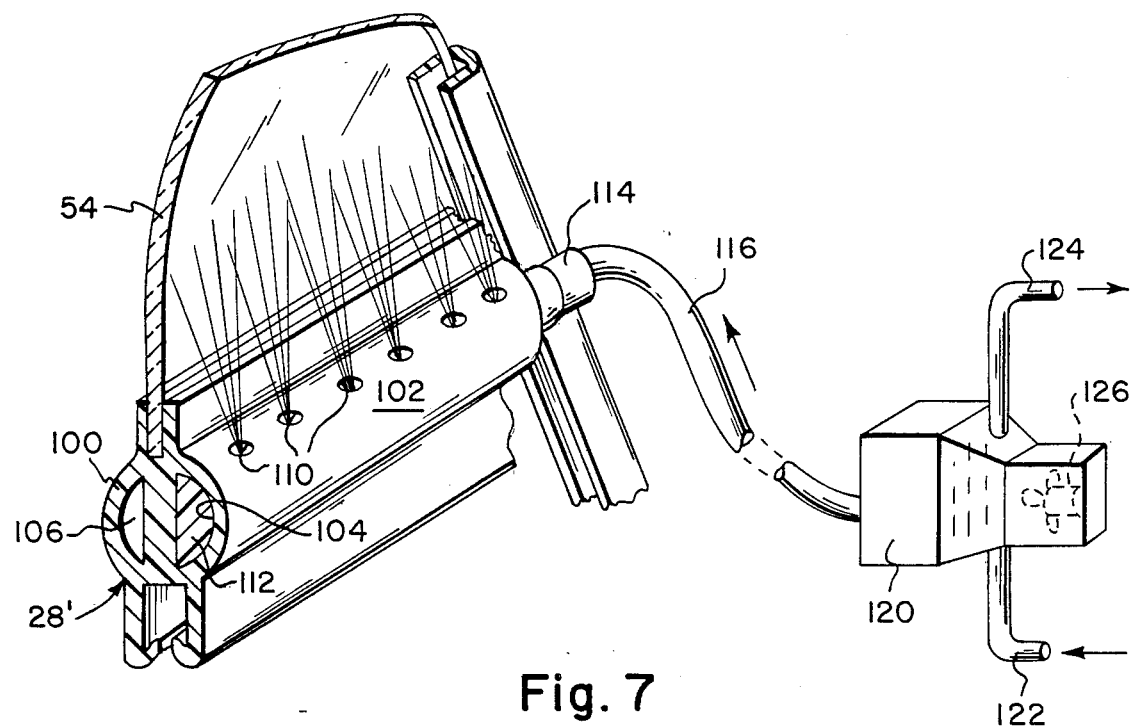
FIG. 7 is a partial isometric view of the inside of an automobile window panel and frame showing an alternate embodiment of the window assembly coupled to the vehicle heating system.

Alternatively and as shown in FIG. 7, a window panel receiving element 28' may be modified so that it is directly coupled to the vehicle's heating system to permit defogging of the side window 54. In this embodiment, a series of spaced-apart vent holes 110 are provided on the upper portion of side wall 102 which vent channel 104 the left end of which is closed by a plug 112. The opposite end of channel 104 is connected via coupling 114 to an outlet hose 116 which, in turn, is coupled to the outlet of a fan-operated, conventional heat exchanger 120 (schematically illustrated), having a hot water intake 122 and outlet 124 interconnected into the standard vehicle heating system. As can be appreciated, fan 126 blows the air heated in heat exchanger 120 by the hot water flowing in heat exchanger conduits (not shown) through hose 116, channel 104 and out vent holes 110. The venting hot air serves to defrost and/or de-ice the side window 54.

While only several embodiments of the present invention have been described, and/or shown, it is obvious that many changes and modifications may be made thereunto without departing from the spirit and scope of the invention.

What is claimed is:

1. A window panel mounting assembly for operatively coupling a window panel having a bottom edge to a mechanism for raising and lowering the window panel within a vehicle door of the type having a peripheral frame extending upwardly and inwardly toward the interior of the vehicle from a window sill line thereon to define a window opening, the peripheral frame adapted to support the top and side peripheral edges of the window panel when the window panel is in a fully raised position, said assembly comprising:
   a sash element capable of being operatively coupled to the mechanism for raising and lowering the window;
   an upwardly extending window panel engagement element fixedly attached to said sash element and extending upwardly therefrom, said window panel engagement element having a cam surface thereon having a predetermined width and including a pair of inwardly extending shoulders thereon;
   a window panel receiving element having a first end thereof fixedly attached to an inner and outer side of the window panel along the bottom edge thereof, said receiving element having a resilient second end connected to said first end by a flexible connecting portion extending downwardly from the bottom edge of said window panel and said second end defining a receiving portion having leg portions spaced a predetermined distance apart to resiliently deflect outwardly upon engaging said cam surface of said upwardly extending window panel engagement element, said flexible connecting portion permitting inward deflection of said window panel toward the vehicle interior as the window panel is moved to the fully raised position;

cam means formed on said second ends of said opposed sides of said window panel receiving element for resiliently capturing said shoulder on said upwardly extending window panel engagement element.

2. The assembly as set forth in claim 1, wherein said window panel engagement element has a trapezoidal upper portion having said cam surfaces formed on the inwardly extending sides of said trapezoid and a lower portion formed integral with the base of said trapezoid but having a width less than said base to define said inwardly extending shoulders.

3. The assembly as set forth in claim 2, wherein said trapezoidal upper portion of said window panel engagement element has an upper surface thereon adapted to engage a cross member of said second end of said window panel receiving element when said window panel is being raised by the mechanism for raising and lowering the window panel and said flexible connecting portion of said window panel receiving element extending a distance sufficient to place the bottom edge of the window panel above the sill line when the mechanism for raising and lowering the window panel is in a fully raised position.

4. The assembly as set forth in claim 1, wherein said window panel engagement element has an upper portion including said pair of inwardly extending shoulders and includes a pair of inclined surfaces extending upwardly and inwardly from said shoulders at a predetermined angle, said second end of said window panel receiving element including a pair of resilient leg elements extending downwardly from and generally parallel to said inner and outer side of said window panel and having said cam means thereon, said cam means having camming surfaces thereon capable of being resiliently deflected outwardly upon engaging said inclined surfaces on said window panel engagement element and springing inwardly and engaging said inwardly extending shoulders, thereby coupling the window panel to said mechanism for raising and lowering thereof.

5. The assembly as set forth in claim 4, wherein the vehicle door has an inner door panel and an outer door panel, said door panels forming an interior for housing the mechanism for raising and lowering the window panel, said inner and outer door panels having complimentary ends extending inwardly towards the interior of the vehicle door forming a gap in the window panel therebetween and forming the window sill line of the window opening, each of said complementary ends of said door panels including generally downwardly extending flanged portions formed thereon, said downwardly extending flange portions being inclined towards their respective inner and outer door panels at an angle equal to said predetermined angle of said pair of inclined surfaces on said window panel engagement element.

6. The assembly as set forth in claim 5, wherein said flexible connecting portion has a central portion and a pair of outwardly bulging sides surrounding said central portion extending downwardly from a bottom edge of said first end and a top edge of said second end defining a receiving portion having leg portions, and spacing said first and second ends a predetermined distance apart, said outwardly bulging sides engaging said ends of said inwardly extending ends of each of said door panels to seal said gap formed therebetween when said window is in the raised position.

7. The assembly as set forth in claim 6, wherein said central portion and said outwardly bulging sides define a channel therebetween and wherein one of said bulging sides has a series of vent holes formed therein directed generally upwardly toward the window panel and communicating with said channel and wherein said assembly includes means for coupling said channel to a hot air source, whereby hot air may be directed to flow through said channel and out said vent holes to effect de-icing of said window panel.

* * * * *